United States Patent
Boyd et al.

(10) Patent No.: US 9,285,454 B2
(45) Date of Patent: Mar. 15, 2016

(54) METHOD, APPARATUS, AND COMPUTER PROGRAM PRODUCT FOR PROCESSING RECEIVED SIGNALS FOR LOCATING

(75) Inventors: Robert W. Boyd, Eidson, TN (US); Jerald W. English, Rogersville, TN (US); Thomas L. Richardson, White Pine, TN (US); Michael A. Wohl, Talbott, TN (US)

(73) Assignee: ZIH Corp., Lincolnshire, IL (US)

( * ) Notice: Subject to any disclaimer, the term of this patent is extended or adjusted under 35 U.S.C. 154(b) by 22 days.

(21) Appl. No.: 13/411,220

(22) Filed: Mar. 2, 2012

(65) Prior Publication Data

US 2012/0225676 A1 Sep. 6, 2012

Related U.S. Application Data

(60) Provisional application No. 61/449,436, filed on Mar. 4, 2011.

(51) Int. Cl.
*H04W 24/00* (2009.01)
*G01S 5/02* (2010.01)
*G01S 5/14* (2006.01)

(52) U.S. Cl.
CPC ............. *G01S 5/0205* (2013.01); *G01S 5/0221* (2013.01); *G01S 5/0226* (2013.01); *G01S 5/14* (2013.01)

(58) Field of Classification Search
CPC ... G01S 5/0205; G01S 5/0221; G01S 5/0226; G01S 5/14
USPC ........................................................ 455/456.6
See application file for complete search history.

(56) References Cited

U.S. PATENT DOCUMENTS

| | | | |
|---|---|---|---|
| 6,204,813 B1 | 3/2001 | Wadell et al. | |
| 2001/0053699 A1* | 12/2001 | McCrady et al. | 455/513 |
| 2003/0092448 A1* | 5/2003 | Forstrom et al. | 455/456 |
| 2004/0185873 A1* | 9/2004 | Gilkes et al. | 455/456.2 |
| 2007/0176749 A1* | 8/2007 | Boyd | 340/10.1 |
| 2007/0230424 A1* | 10/2007 | Wisherd | 370/338 |
| 2008/0062043 A1* | 3/2008 | Gezici et al. | 342/387 |
| 2008/0101329 A1 | 5/2008 | Richards et al. | |
| 2009/0303067 A1 | 12/2009 | Sharp | |
| 2011/0211453 A1* | 9/2011 | Wohl et al. | 370/241 |
| 2012/0162014 A1* | 6/2012 | Wu et al. | 342/387 |

FOREIGN PATENT DOCUMENTS

| | | | |
|---|---|---|---|
| EP | 0964265 | * | 5/1999 |
| WO | WO2008066537 | * | 6/2008 |
| WO | WO 2010/000036 A1 | | 1/2010 |

OTHER PUBLICATIONS

International Search Report and Written Opinion from International Application No. PCT/US2012/027555 mailed Aug. 9, 2012.

* cited by examiner

*Primary Examiner* — Timothy Pham

(57) ABSTRACT

Example embodiments are directed to various aspects of processing received signals for determining a location of a source of the signals. An example method may include generating signal timing information, and determining times for a plurality of window periods for the signal of interest based on the signal timing information. The example method may also include retrieving, from a memory device that stores the signal stream, symbols of the signal of interest based on the window periods, and formatting the symbols of the signal of interest in preparation for determining a location of a source of the signal of interest. Additional and alternative methods and apparatuses are also provided.

31 Claims, 6 Drawing Sheets

METHOD, APPARATUS, AND COMPUTER PROGRAM PRODUCT FOR PROCESSING RECEIVED SIGNALS FOR LOCATING

PRIORITY CLAIM

This application claims priority from U.S. Provisional Application Ser. No. 61/449,436, filed on Mar. 4, 2011, entitled "Method, Apparatus, and Computer Program Product for Processing Received Signals for Locating" which is hereby incorporated by reference in its entirety.

TECHNICAL FIELD

Embodiments of the present invention relate generally to the field of wireless signal processing, and more particularly, example embodiments relate to processing received signals for locating a source of the signals.

BACKGROUND

With the continued and rapid evolution of wireless technologies, there is an ever increasing demand to leverage the transmission of wireless signals to locate a source of a signal, which may be affixed to an asset. By locating the source of the signal, the location of the asset may then be known. To facilitate the locating of an asset, an electronic wireless communications device having at least a transmitter that sends out signals may be affixed to a movable asset. The signals from the transmitter may be received by receivers that are within range and the signals may be processed. By processing the signals provided by the transmitter and received at a few receivers, a determination of the location of the transmitter may be performed.

The ability to locate an asset has become increasingly important in a number of business environments. Accordingly, end users continue to demand that location determinations be increasingly accurate to pin-point the location of an asset within a narrow error range. Further, end users increasingly demand precision with respect to location determinations such that the results are consistently reproducible and erroneous location determinations are eliminated or reduced.

SUMMARY

The following provides a description of various example apparatuses, methods, and computer programs stored on computer-readable media that facilitate the ability to efficiently determine a location of an asset with precision and accuracy. One example apparatus that may participate in the process of determining a location is a receiver. The receiver may be configured to capture wireless signals and process those signals to determine, for example, a time of arrival at the receiver. This time of arrival information may be combined with other time of arrival information regarding the same signal received at other receivers to determine a location.

According to some example embodiments, a system for locating a signal source may be provided. The system may comprise a plurality of receivers comprising a first receiver, and a plurality of node devices. The first receiver may comprise processing circuitry configured to at least receive a wireless signal stream that originated from at least one of the node devices, wherein the wireless signal stream includes a signal of interest, generate signal timing information comprising one or more pulses based on a received wireless signal stream, the pulses being time-compressed portions of the signal of interest, and determine times for a plurality of window periods for the signal of interest based on the signal timing information, wherein each timing window is associated with a respective pulse of the timing information.

According to some example embodiments, an example method may be provided. The method may comprise receiving a wireless signal stream that originated from a node device, the wireless signal stream including a signal of interest, generating signal timing information comprising a one or more of pulses based on the wireless signal stream, the pulses being time-compressed portions of the signal of interest, and determining times for a plurality of window periods for the signal of interest based on the signal timing information, wherein each timing window is associated with a respective pulse of the timing information.

According to some example embodiments, an example apparatus may be provided. The example apparatus may comprise processing circuitry configured to at least receive a wireless signal stream from a node device, the wireless signal stream including a signal of interest, generate signal timing information comprising a one or more of pulses based on the wireless signal stream, the pulses being time-compressed portions of the signal of interest, and determine times for a plurality of window periods for the signal of interest based on the signal timing information, wherein each timing window is associated with a respective pulse of the timing information.

According to some example embodiments, a non-transitory computer-readable storage medium having program code stored thereon may be provided. The non-transitory computer-readable storage medium may have program code being configured to, upon execution, direct an apparatus to at least receive a wireless signal stream from a node device, the wireless signal stream including a signal of interest, generate signal timing information comprising a one or more of pulses based on the wireless signal stream, the pulses being time-compressed portions of the signal of interest, and determine times for a plurality of window periods for the signal of interest based on the signal timing information, wherein each timing window is associated with a respective pulse of the timing information.

BRIEF DESCRIPTION OF THE DRAWING(S)

Reference will now be made to the accompanying drawings, which are not necessarily drawn to scale, and wherein.

DETAILED DESCRIPTION

Figure 1:
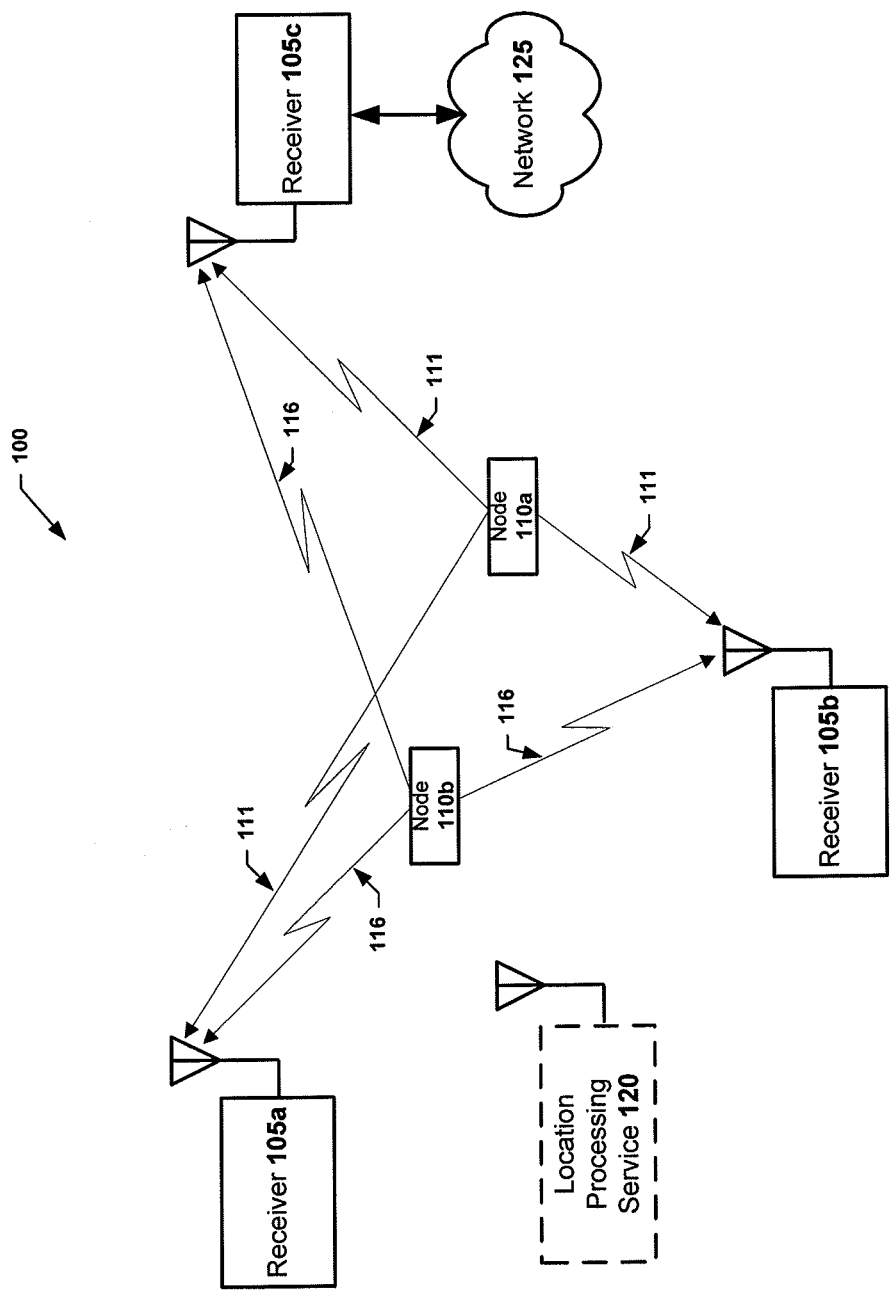
FIG. 1 illustrates an example wireless locating system according to various example embodiments.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

In accordance with an example embodiment, FIG. 1 depicts a wireless locating system 100. The system 100 may include one or more receivers 105 (e.g., receivers 105a, 105b, and 105c) and one or more nodes 110 (e.g., nodes 110a and 110b) to be located. The system 100 may also include a communications network 125 (e.g., a wireless area network (WLAN)) that provides a communications connection between the receivers 105 and with other networks and communications devices. Additionally, in some example embodiments, the system 100 may include a location processing service 120.

According to various example embodiments, the system 100 may be any type of wireless environment including but not limited to a WLAN. In some example embodiments, the system 100 may be dedicated to locationing functionality and may operate in the same space as a WLAN system, but the system 100 may operate separate from the WLAN such that routing and other WLAN functionality is performed by separate WLAN hardware. The system 100 may support locationing of wireless signals via any type of communications standard. Wireless signaling within the system 100 (e.g., signaling between the nodes 110 and the receivers 105) may be conducted on one or more frequency or communication channels. As a more specific example, the system 100 may be configured to support signaling in accordance with ISO24730, IEEE 802.x (e.g., IEEE 802.11, IEEE 802.15, and the like), Zigbee, ultra wide-band (UWB), and signaling based on various other standards. Proprietary, non-standards based communications may also be supported.

The system 100 may operate as a system for locating transmitters, such as the transmitters of nodes 110. To locate these nodes, the system 100 may be configured to support applications such as time-of-arrival (ToA) and differential time-of-arrival (DToA) location applications where, for example, a node 110 transmits a signal to receivers 105 that may be detected and processed to identify the location of the node 110.

Nodes 110 may be devices such as, for example, mobile terminals configured to transmit a wireless signal, and in some instances may be referred to as tags with wireless signaling capabilities. Nodes 110 may be a variety of different types of devices and may each transmit wireless signals using a carrier frequency that is particular to the type of node device. Nodes 110 may be any type of device that includes at least a transmitter, which may include a node specifically designed for asset locating that is affixed to an asset. A node 110 may alternatively be a receiver acting as a reference node. The nodes 110 may, in some example embodiments, comprise an access point, a handheld device (e.g., a cellular phone, a tablet device), a mobile computer, or the like. In some embodiments, the node 110 may be dedicated and specifically designed for the function of locating an asset. However, in some example embodiments, the node 110 may be, for example, a cellular phone that transmits wireless signals for the purpose of cellular communications, but the system 100 may be configured to detect those signals and perform locating with respect to the cellular signals. As such, in some example embodiments, the nodes 110 may be configured to implement aspects of a wireless locating system.

In some example embodiments, a receiver device (e.g., prior to configuration within the system as a receiver 105) may be treated as a node and signals originating from the receiver device may be analyzed using locating techniques, such as for example those described herein, to identify the location of the receiver device. The use of these locating techniques to locate a receiver device that is being treated as a node may be part of a configuration procedure for configuring a receiver 105 within the wireless locating system 100 or may be part of a process to maintain a system time for use in signal processing to determine the location of nodes.

According to various example embodiments, a node 110 may be configured to transmit a wireless signal for the purpose of locating the node 110. In this regard, a node 110 may be configured to transmit a wireless signal to the receivers 105 to facilitate locating the node 110 using a variety of locating techniques, including signal arrival time, time of arrival (ToA) or time difference of arrival (TDoA), signal angle of arrival (AoA), signal magnitude such as received channel power indication (RCPI) or received signal strength indication (RSSI), range to signal source such as time of flight (ToF), two way ranging (TWR), symmetrical double sided two way ranging (SDS-TWR) or near field electromagnetic ranging (NFER), or the like; possibly used in combination. Referring to FIG. 1, node 110a may transmit wireless signal 111 and node 110b may transmit wireless signal 116 to facilitate determining the geographic location of node 110a and node 110b, respectively.

The location processing service 120 may be a computer, server, or other network device in communication with the system 100, via a wired or wireless connection. As depicted in FIG. 1, for example, the location processing service 120 may include an antenna for network communications to, for example, interface with the receivers directly or via the network 125. In other embodiments, the location processing service may be hardwired to a wired network that is accessible via network 125. The location processing service 120 may be configured to perform any type of processing for the system 100. For example, the location processing service 120 may be configured to perform computations with respect to signals of interest or processed data associated with signals of interest, e.g., signal ToA information, to determine the location of a source of a particular signal that was received by the receivers 105. While, according to some example embodiments, the receivers may perform preliminary signal processing, the location processing service 120 may be configured to receive processed data about a signal from the receivers 105 and consider the received data in the aggregate (e.g., considering data from multiple receivers) to determine the location of a source of the signal.

The location processing service 120 may, in some example embodiments, be a receiver device that has been configured to also operate as a location processing service 120. While in some example embodiments the location processing service 120 may be a single network entity, according to various other alternative embodiments, the functionality of the location processing service may be separated and/or distributed within the system 100, for example, across the receivers 105.

The network 125 may be any type of wired or wireless network for communications. Network 125 may incorporate connections to other local area networks (LANs) or WLANs, and network 125 may, in some example embodiments, provide a connection between the system 100 and, for example, the Internet. While network 125 is depicted in FIG. 1 as being connected or in communication with receiver 105c, according to various exemplary embodiments, some or all of the receivers 105 of system 100 may be connected or in communication with network 125, and some or all of the nodes 110 of system 100 may also be connected or in communication with the network 125. In some example embodiments, the receivers 105 may be connected as clients to the network 125.

Figure 2:
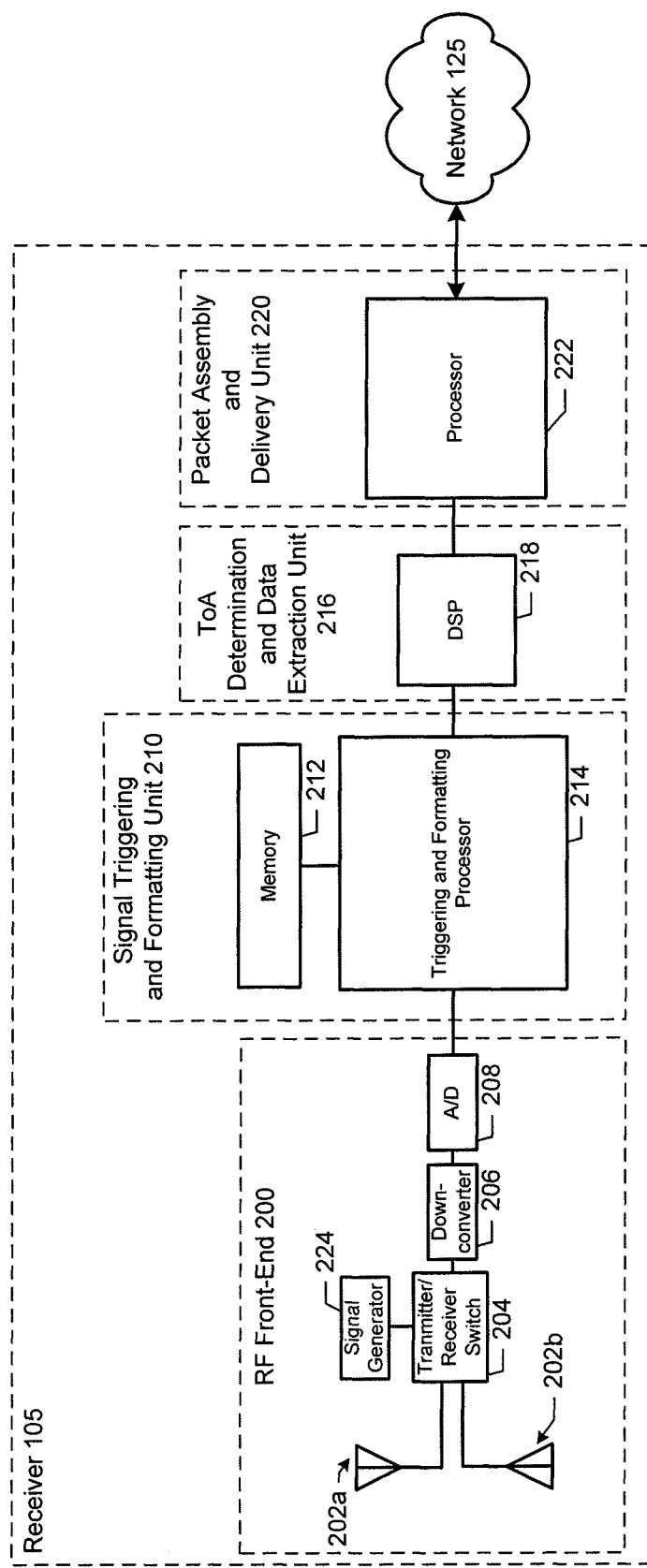
FIG. 2 is a block diagram of an example receiver according to various example embodiments.

FIG. 2 provides a detailed block diagram of a receiver 105, which is configured to facilitate node locating using ToA techniques. Even though the description of the receiver that follows specifically includes components configured to implement ToA-based techniques, it is contemplated that the ToA components and configuration could be replaced with any other locating technology, such as those listed above. In other words, the ToA features of the receiver are merely exemplary of one type of locating technology that could be implemented by the receiver 105, and other technologies may additionally or alternatively be incorporated into the receiver 105.

According to some example embodiments, the receiver 105 may include an RF front-end 200, a signal triggering and formatting unit 210, a ToA determination and data extraction unit 216, and a packet assembly and delivery unit 220. It is noteworthy that each of the RF front-end 200, the signal triggering and formatting unit 210, the ToA determination and data extraction unit 216, and the packet assembly and delivery unit 220 may be scalable, to the extent necessary, within the receiver 105 thereby permitting parallel processing of signals. Further, while functionalities of the receiver 105 are described and depicted with respect to separate components or groups of components, it is contemplated that the various functionalities described may be performed by various combinations of components.

The RF front-end 200 may be configured to receive wireless signals (e.g., a wireless signal stream) and convert the signals for use in signal identification triggering and ToA processing. To perform these operations, the RF front-end 200 may include an antenna 202, a downconverter 206, and an analog-to-digital (A/D) converter 208. In some example embodiments, the antenna 202 may comprise multiple antennas (e.g., illustrated as two antennas 202a and 202b). According to various example embodiments, the use of multiple antennas may be leveraged to capture and address multipath signals. The antennas 202 may be used for both receiving and transmitting wireless signals. To assist in signal detection and to compensate for multipath, two antennas may be used and the signals received at each antenna may be compared.

To facilitate a level of flexibility in the operation of the antennas, a switch 204 may be implemented between the antennas 202a and 202b. The switch may be controlled by, for example, the processor 222 to facilitate capturing of wireless signals via the antennas and transmitting wireless signals, when needed. Switch 204 also permits the receiver 105 to act as a node and send out the appropriate wireless signals to be received by other receivers. As such, according to some example embodiments, any antenna may be controlled such that it is used as a transmitting antenna for short periods of time. Through this feature, the receiver may operate as a reference node or reference tag at a known location that permits the system 100 to keep a system time or a system clock for use when determining a location of a source of a signal. To leverage this flexibility of the antennas to be able to transmit, the receiver 105 may include a signal generator 224. In this regard, the signal generator 224 may be configured to output a specific, generated signal to an antenna for transmission, when required. The signal may be one that makes the receiver 105 appear to be a node that may be located.

Via the antennas, the RF front-end 200 may be configured to receive and convert a broad portion of the RF spectrum. In this regard, according to some example embodiments, the entire ISM (industrial, scientific, and medical) band, or a portion thereof, may be received via the RF front-end 200 in preparation for signal processing to determine a location. The RF front-end may therefore be configured to generate a segmented or overlapped baseband representation of the received signals to be passed to the signal triggering and formatting unit 210 for temporary storage, triggering, and formatting. As such, any wireless device that operates in the ISM band may be located by the by using the receivers 105.

The downconverter 206 and the A/D converter 208 may be configured to prepare the received signals for triggering and storage. In this regard, the downconverter 206 and A/D converter 208 may operate to downconvert and digitize the received band into a baseband representation for further signal processing within the receiver. As such, according to some example embodiments, the RF front-end 200 may provide a converted (e.g., baseband) version of a received band to the signal triggering and formatting unit 210.

The signal triggering and formatting unit 210 may include a triggering and formatting processor 214 and a memory 212. The processor 214 may be designed as an application specific device such as a field programmable gate array (FPGA), an application specific integrated circuit (ASIC), or the like. The memory 212 may be any type of memory device (e.g., volatile or non-volatile) configured to store signals received from the RF front-end 200. In some example embodiments, the memory 212 may be a double data rate (DDR) memory device, such as a DDR synchronous dynamic random access memory (SDRAM).

In function, the processor 214 may be configured to receive the converted signals provided by the RF front-end 200 as a stream of wireless signals, and route the converted signal to the memory 212 for storage in a raw data format. In some example embodiments, the converted signals may be derived from a plurality of received wireless signal streams, where each stream has a different carrier frequency. Storage of the signals within the memory 212 may be performed such that the memory operates as a circular buffer that keeps a history of received signals. The processor 214 may also be configured to analyze some or all of the received signals within the stream to determine whether a received signal is one of a predefined set of signals of interest. A signal recognizer may be implemented to determine whether the received stream includes a signal of interest. To do so, the signal recognizer may be configured to generate signal timing information in the form of a series of pulses or one or more pulses. Generating the signal timing information may be performed with respect to signals at different frequencies or different channels and possibly received from different source devices. If a signal is determined to be a signal of interest, then a window controller may be triggered. Via the triggering, the window controller may determine a time for a plurality of window periods for the signal of interest associated with each of the pulses. The window periods may be determined for each of the received wireless signal streams, which may be at different frequencies or on different channels. Using the window periods, the processor may be configured to retrieve the desired signal information (i.e. the stored, converted signal) from the memory 212, format the retrieved signal information in the form of one or more symbols, and provide the formatted signal information to the ToA determination and data extraction unit 216. According to some example embodiments, to format the retrieved signal information, the processor 214 may quadrature sample the received signal information to be provided to the ToA determination and data extraction unit 216.

Figure 3:
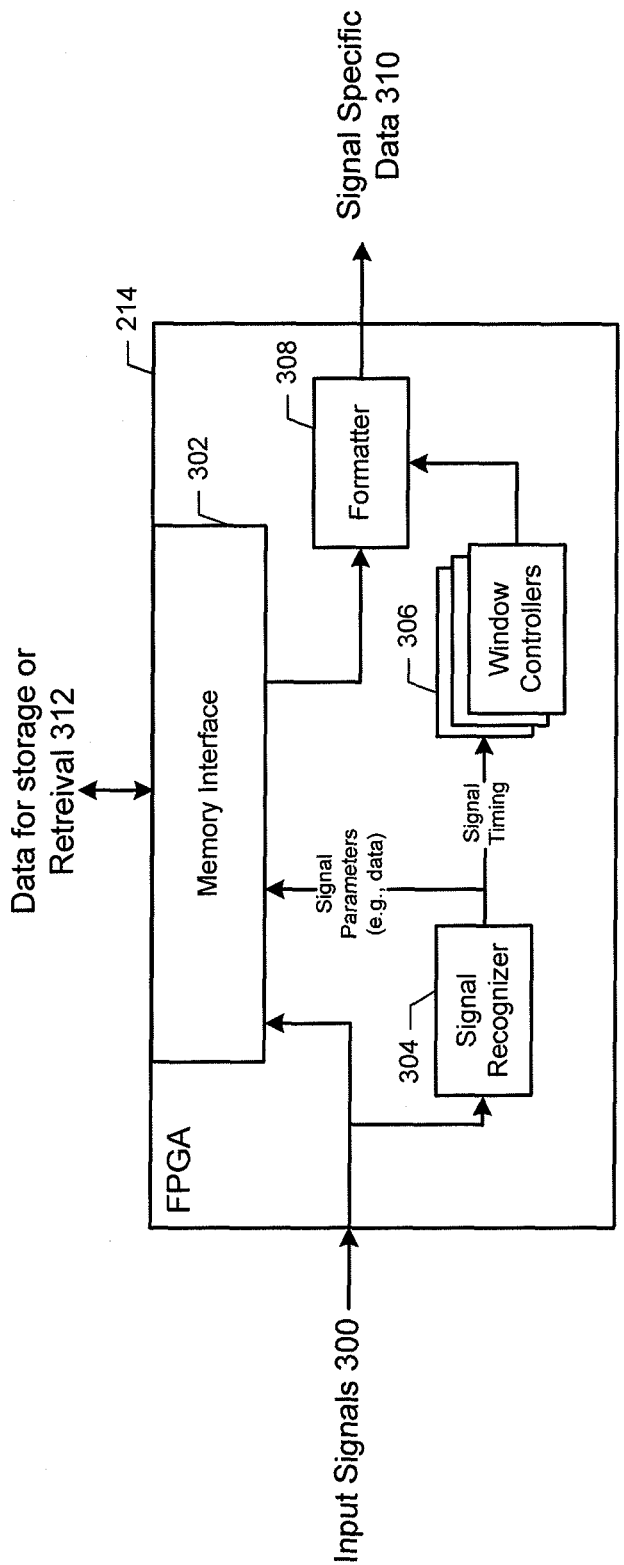
FIG. 3 illustrates an example signal triggering and formatting unit according to various example embodiments.

Having generally described the functionality of the signal triggering and forwarding unit 210 in the context of FIG. 2, FIG. 3 provides some additional and alternative details of the functionality implemented by the processor 214. As mentioned above, the signal triggering and formatting unit 210 may include a processor 214. FIG. 3 provides a block diagram of the functionality provided by the processor 214. In this regard, the processor 214, which is depicted in FIG. 3 as an example FPGA, may include a memory interface 302 (or memory controller), a signal recognizer 304, window controllers 306, and a formatter 308. While FIG. 3 depicts the structure of processor 214 as an FPGA, it is contemplated that the processor 214 may be embodied as any type hardware device configured to perform the functionality of processor 214, such as a general purpose processor specifically configured, via the execution of program code stored in a memory device, to perform the functionalities.

As indicated above, the processor 214 may be configured to receive representations of wireless signals as part of the monitored band that was received and converted by the RF front-end 200. The representations may be received as input signals 300. The input signals 300 may be representations of the wireless band received at the RF front-end, but converted to baseband. Upon receipt, the input signals 300 may be forwarded to the memory interface 302 and the signal recognizer 304. The memory interface 302 may be configured to interface with the memory 212 to store the input signals 300 and provide for retrieving the input signals 300 when requested. As such, the memory interface 302 may be configured to receive the input signals 300 and store the signals. In some example embodiments, the memory interface 302 may be configured to store the inputs signal such that the memory 212 operates as a circular buffer. As such, a first-in/first-out technique may be implemented that permits a running time duration of signals to be stored in the memory 212, where the time duration is a function of the memory space available for signal storage. In some example embodiments, the memory 212 may be of a memory size that allows the memory interface 302 to store 0.25 seconds of signals in the memory 212.

The input signals 300 may also be provided to a signal recognizer 304 for analysis. The signal recognizer 304, which may include one or more matched filters, may be configured to identify a signal of interest. In this regard, the signal recognizer 304 may be configured to compare an incoming signal to one or more reference signals, or reference waveforms, to determine whether the input signal is a signal of interest. In some instances, the reference signals may be referred to as triggers. The reference signals may be defined with respect to a pattern of data, the type of modulation, the bit spacing, and/or the like. In some example embodiments, the reference signals may be defined to identify a particular packet header having, for example, a particular MAC address, or particular data within the body of the packet. In some example embodiments, the reference signals may be software configurable and, as such, may be readily changed to permit recognition of new desired signals. According to some example embodiments, a defined spacing of pulses, with respect to time, that are output from the matched filter may be an indication that a signal of interest has been or is being received.

To recognize a signal, according to some example embodiments, the signal recognizer 304 may include a matched filter or matched filter functionality. In some example embodiments, the matched filter or filters may be configured to analyze a number of frequency channels within the input signals. As part of the recognition process, the signal recognizer 304 may be configured to demodulate a recognized input signal and transform the signal into pulses. These pulses may, according to some example embodiments, be forwarded as signal timing information to the window controllers 306. Additionally, the output of the signal recognizer 304 may provide signal parameters (e.g., phase and data) derived from the received signal to the memory interface for storage.

Upon detecting or recognizing a signal of interest, a triggering event may occur, and the signal recognizer 304 may trigger a window controller 306. The triggering event may be the occurrence of a pulse at the output of the signal recognizer 304. The window controller 306 may be configured to track the duration of the signal of interest to determine what portion of the memory 212 should be retrieved for signal processing. In this regard, the window controller 306 may determine a number of epochs or symbols of information to be retrieved from the memory. The duration may be determined such that a threshold number of partial sums (e.g., 12 partial sums) are captured within the window. Partial sums may be utilized, for example, as indicated in U.S. Pat. No. 6,366,626, which is hereby incorporated by reference in its entirety. In some example embodiments, the window controller 306 may be configured to operate as a set-on receiver. Further, in some example embodiments, the processor 214 may include a number of window controllers 306 (e.g., eight window controllers) that permit the tracking of a plurality of signals of interest.

Figure 4:
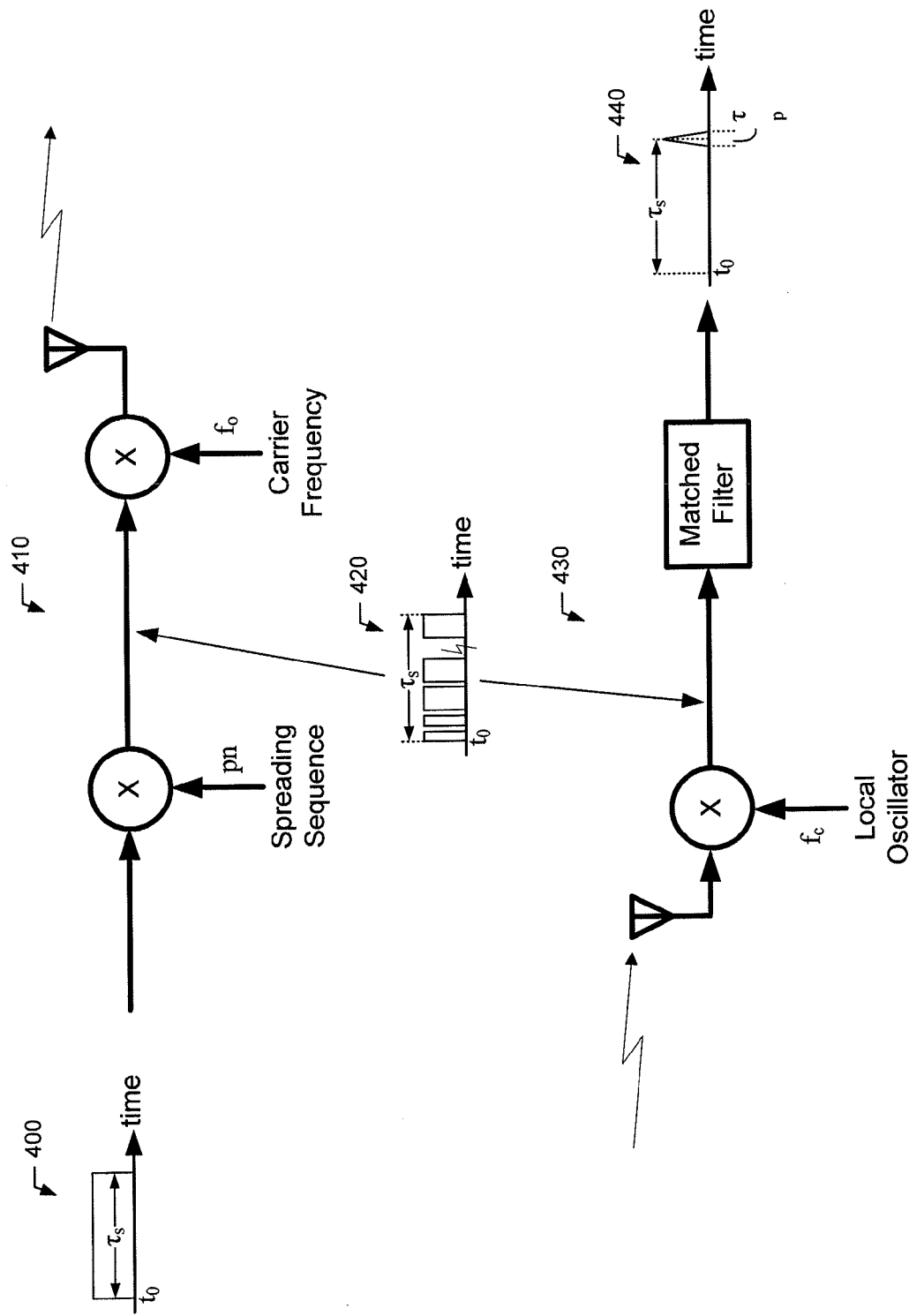
FIG. 4 illustrates the operation of an example matched filter with respect to a received, one symbol signal.
Figure 5:
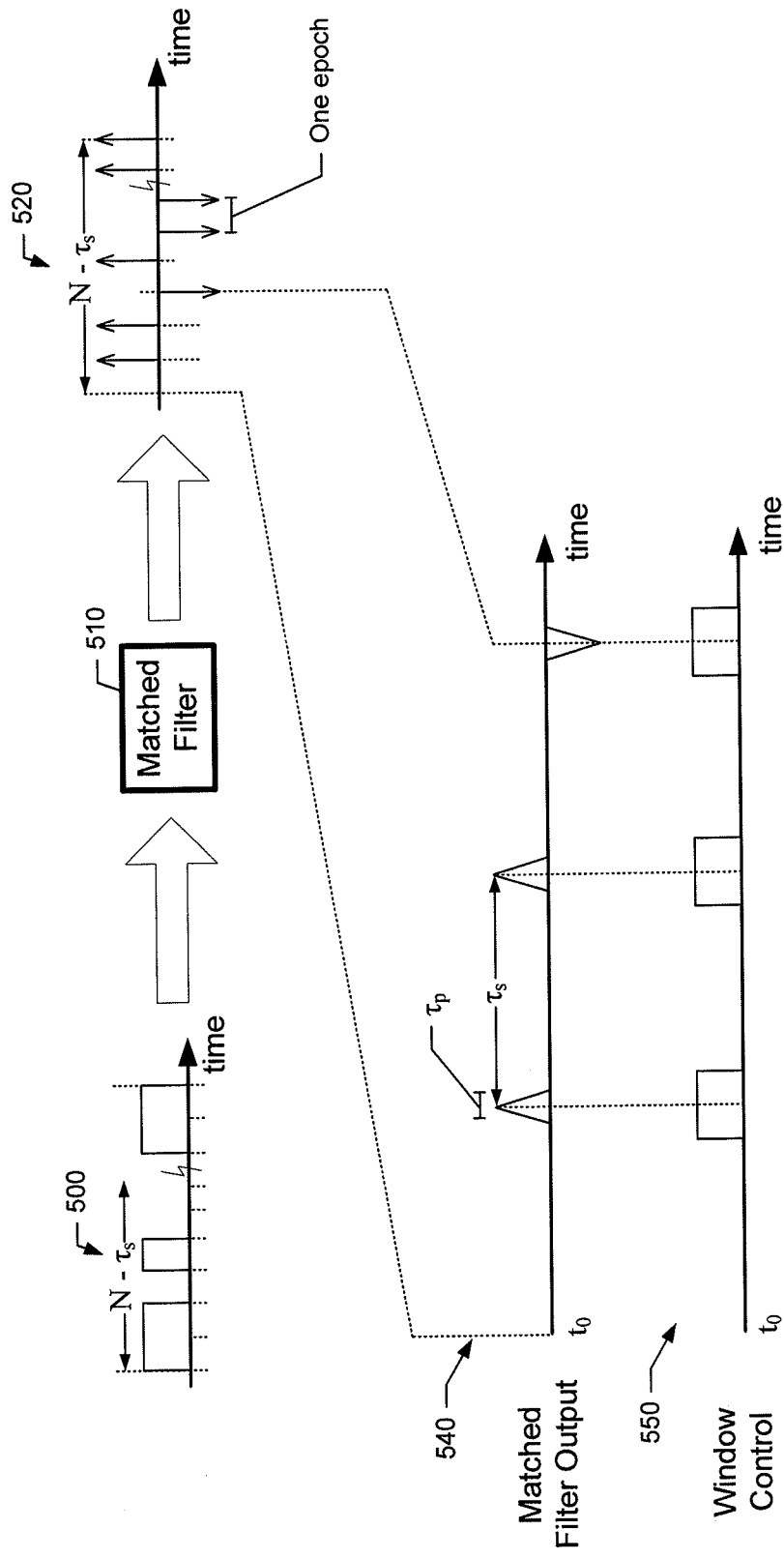
FIG. 5 illustrates the operation of an example matched filter with respect to a received, multi-symbol signal.

FIGS. 4 and 5 illustrate the functionality of the signal recognizer and the window controller(s) with respect to the signals that are being analyzed and generated throughout the process. FIG. 4 illustrates an example where an initial signal is a simplified signal based on one-bit of information, while FIG. 5 builds on the description of FIG. 4 by introducing a more complex initial signal.

FIG. 4 illustrates a transmitting device 410 (e.g., a node) and a receiving device 430 (e.g., a portion of receiver 105). In the transmitting device, a signal 400 may be initially generated as any type of signal. In this case, the signal 400 may be a direct spread waveform (e.g., IEEE 802.11a, ISO24730 waveform, or the like). The signal 400 includes a single data symbol (e.g., one bit). The time duration of the data symbol is represented by $\tau_s$. On the time axis, the symbol may begin at time $t_0$. Via a spreading sequence, the signal 400 is spread by one epoch of a psuedonoise (pn) code to generate the signal 420. The signal may then be upconverted by a carrier frequency $f_0$ and transmitted. The signal may then be received by the receiving device 430, which may include a matched filter. The matched filter may be one example of the signal recognizer of 304 of FIG. 3 or a portion of the signal recognizer 304.

Upon receipt of the transmitted signal, the signal may be downconverted by a local oscillator of the receiving device 430, which may be a component of the RF front end (e.g., downconverter 206). After downconversion, the signal may then again be in the form of the signal 420 when the signal enters the matched filter. Due to its configuration, the matched filter may output a pulse which is compressed in time by a spread ratio (Rs). In this regard, for example, if the signal is an ISO24730 signal, the spread ratio is 511. As such, the output of the matched filter may be meaningful in the last $511^{th}$ of the signal (i.e., the first 510/511ths of the signal may be overlooked or ignored). Further, in some example embodiments, only in the event that there is a pulse present in the meaningful portion of the output signal (e.g., the last $511^{th}$ of an ISO24730 signal or another portion based on the spread ratio) is there deemed to be any significant and useful information. The duration of the pulse may be defined as $\tau_p$.

As mentioned above, FIG. 5 illustrates an example where the initial signal is a more complex signal. The signal 500 is the initial signal, which extends the concepts described with respect to FIG. 4 to an N-symbol message, where N is the number of symbols in the message. According to various example embodiments, various types of data may be included in the signal 500 (which may be received from a device such as a node 110), the types of data including, for example, tag identifier information, information about the asset that a tag is associated or affixed to, a reading or measurement captured by a sensor, message handling priority information, or the like. In signal 500, the data is shown as binary valued. Signal 500 may be provided, after having been received from a node 110, to the matched filter 510. Again, the matched filter may embody or be a portion of the signal recognizer 304. At the output of the matched filter, the signal 520 may be comprised of positive and negative pulses spaced in time by one epoch (or symbol duration). According to some example embodiments, the pulses are provided only at time intervals when pulses of interest for further analysis are present.

The matched filter may be configured to provide signal timing information by indicating when the signal of interest starts and when a next pulse of the signal of interest is expected. The matched filter may provide, as outputs of the signal recognizer 304 in FIG. 3, parametric signal information (e.g., phase and data of the signal) to the memory interface 302. The matched filter may also provide the signal timing information to the window controllers 306 of FIG. 3. Graph 540 illustrates a more granular depiction of the pulse output provided by the matched filter for a duration of three epochs.

It is noteworthy, that inexpensive crystals, for use in nodes to keep time at the node, can be inaccurate and can cause a situation where a receiver's local oscillator differs from a node's by a substantial amount. For example, the frequency difference multiplied by the symbol duration may be greater than 0.5. The difference may cause the matched filter of the receiver to have diminished responsiveness to received signals of interest. To avoid this issue, a bank of matched filters may be included in the signal recognizer 304. Each matched filter within the bank may be centered at a different frequency, which improves the likelihood that at least one of the matched filters is capable of detecting the signal. In other words, a fractional matched filter may be associated with particular fractions of a symbol or epoch. The complex (e.g., coherent) partial correlation results from each fractional matched filter may also be rotated and summed to approximate filters matched to the signal at several different frequencies.

The window controllers 306 may be configured to open the window (e.g., store the matched filter output data to the memory) for an interval that includes the duration of the pulse $\tau_p$. Graph 550 of FIG. 5 illustrates an example of a control signal for the window controller indicating when the window is open (e.g., the signal is high) and when the window is closed (e.g., the signal is low). The window may, in some example embodiments, be open only once per epoch. According to various embodiments, the window controllers may be configured to time or track the pulse appearance as the pulse is being analyzed, or the window controllers may be configured to use a window period that is fixed relative to the expected window duration. In this regard, according to some example embodiments, the window period may correspond to a fixed number of samples. The window controllers may therefore be configured to identify where some or all of the information pertaining to a particular signal of interest is held in the memory. Thus, the window controllers 306 may be configured to pass information about when the signal began and ended to the formatter 308 in a form that relates to the continuous storage of the input signal 300. For example, the window controllers 306 may be configured to provide the formatter 308 with a memory address for retrieving the information about the signal from the memory. The window controllers 306 may also be configured to identify when the signal of interest is complete or no longer present, by analyzing the pulse output being provided by the matched filter.

Having tracked a signal of interest, the window controllers 306 may pass window information, such as the duration of a signal of interest, to a formatter 308. Based on the window information, the formatter 308 may request and retrieve the stored version of the signal of interest from the memory 212, via the memory interface 302. The formatter 308 may receive a digitized band that includes the signal of interest based on a number of, for example, epochs identified by the window controller. In some example embodiments, the formatter 308 may also request and retrieve the demodulated and transformed pulses that were generated by the signal recognizer 304 and stored in the memory 212.

Upon retrieving the signal representation, the formatter 308 may format the representation of the signal of interest. In this regard, the representation of the signals stored in the memory may be robust and include a high level of granularity. The formatter 308 may be configured to filter the retrieved signal to a desired quality level for use by the DSP 218. As such, the formatter 308 may be configured to provide signal specific data 310 to the ToA Determination and Data Extraction Unit 216. Further, the DSP 218 may be provided with only a small fraction of the total data included in the input signals 300, which includes the necessary information about the signal of interest. According to some example embodiments, the fraction of data provided to the DSP 218 may be less than 0.02% of the originally received data for an ISO24730 signal. The formatter 308 may also be configured to pass the transformed pulses generated by the signal recognizer 304 to the DSP 218. Additionally, gain information may be passed to the DSP 218. The information provided to the DSP 218 may then be analyzed and processed to perform ToA determination and data extraction.

Referring again to FIG. 2, the ToA determination and data extraction unit 216 may receive the formatted signal information from the signal triggering and formatting unit 210. The ToA determination and data extraction unit 216 may be implemented using one or more digital signal processors (DSPs) to further process the formatted signal information. FIG. 2 illustrates a receiver 105 using a single DSP 218, which may be a floating point DSP. The DSP 218 may be configured to receive the formatted signal information from the signal triggering and formatting unit 210, demodulate the signal, and time stamp the time of receipt of the signal. In this regard, the DSP 218 may be configured to determine a time of arrival for the signal, and extract any data that may have been included as payload in the received signal. To determine the ToA, the DSP 218 may be confirmed to identify a first leading edge of the waveform associated with the signal of interest. The DSP 218 may be configured to use magnitude-squared signal information to determine the ToA and data. However, in some example embodiments, the DSP 218 may be configured to use quadrature processing to reach sub-chip multipath resolution. The DSP 218 may be capable of reaching these levels of resolution by analyzing quadrature sampled information provided by the signal triggering and formatting unit 210. As such, the I and Q information may be considered in conjunction with a ToA profile to determine the time of arrival of the signal. In this regard, quadrature processing may permit the estimation of the phase of the received signal. The effect of interference and noise can be significantly reduced by processing energy (and in some instances only energy) that is in-phase with the desired signal. Reducing or eliminating these effects can be important when attempting to determine when the first signal energy arrived (e.g., find the leading edge of the correlation) since the correlation energy may be small at that instant. The time of arrival and the data included in the signal may be passed to the packet assembly and delivery unit 220 after being determined.

To determine a meaningful ToA value, the receivers 105 within the system 100 may share a single time reference. Since determining the location of a source of a signal is a time-dependent analysis, any error introduced by the time reference may cause substantial inaccuracies in the results. As such, to maintain accuracy, the time reference may be determined and kept at each receiver. The time reference may be implemented in a number of ways. In one example embodiment, reference nodes may be used to maintain the time reference at the various receivers. In this regard, since the location, and possibly the time, when the reference node transmits a wireless signal are known, the reference time can be determined at each receiver. The DSP 218 may be configured to perform this analysis to maintain the reference time. In receivers that utilize inaccurate oscillators to keep time, the process of determining the reference time may be frequently performed to ensure high quality locating results.

In some example embodiments, the DSP 218 may be configured to determine location-related information about a signal in one or more of a number of forms in addition to, or as an alternative to ToA determinations. In this regard, the DSP 218 may be perform signal origination locating based on various techniques including signal arrival time such as time of arrival (ToA) or time difference of arrival (TDoA), signal angle of arrival (AoA), signal magnitude such as received channel power indication (RCPI) or received signal strength indication (RSSI), range to signal source such as time of flight (ToF), two way ranging (TWR), symmetrical double sided two way ranging (SDS-TWR) or near field electromagnetic ranging (NFER), or the like; possibly used in combination.

The packet assembly and delivery unit 220 may be configured to receive the ToA and data from the ToA determination and data extraction unit 216, and packetize this received information for a location determination procedure via the processor 222. The processor 222 may be, according to some example embodiments, a general purpose processor or CPU specifically configured by instructions retrieved from a memory. In some example embodiments, the processor 222 may be an application specific device that may be incorporated into other devices within the receiver, such as, for example, the processor 214. In some example embodiments, the processor 222 may be running a version of the Linux operating system. Since the location determination may also be based on data about the signal being generated by other receivers, the processor 222 may be configured to forward the ToA and data (e.g., via the network 125) to, for example, a location processing service 120 to determine the location. In some example embodiments, the receiver 105 may also operate as the location processing service, and as such, the processor 222 may be configured to receive ToA and data from other receivers and determine the location of the source of the signal.

Further, in some example embodiments, the ToA information may be weighted by the location processing service. In this regard, the location processing service may consider the ToA information and determine a degree of deviation from an expected ToA. The further a ToA is from an expected or estimated value, the smaller the weighting may be for the ToA. By using the weightings, the affect on an improper ToA can be lessened to avoid or reduce incorrect location due to issues such as multipath which can affect the location determination.

Figure 6:
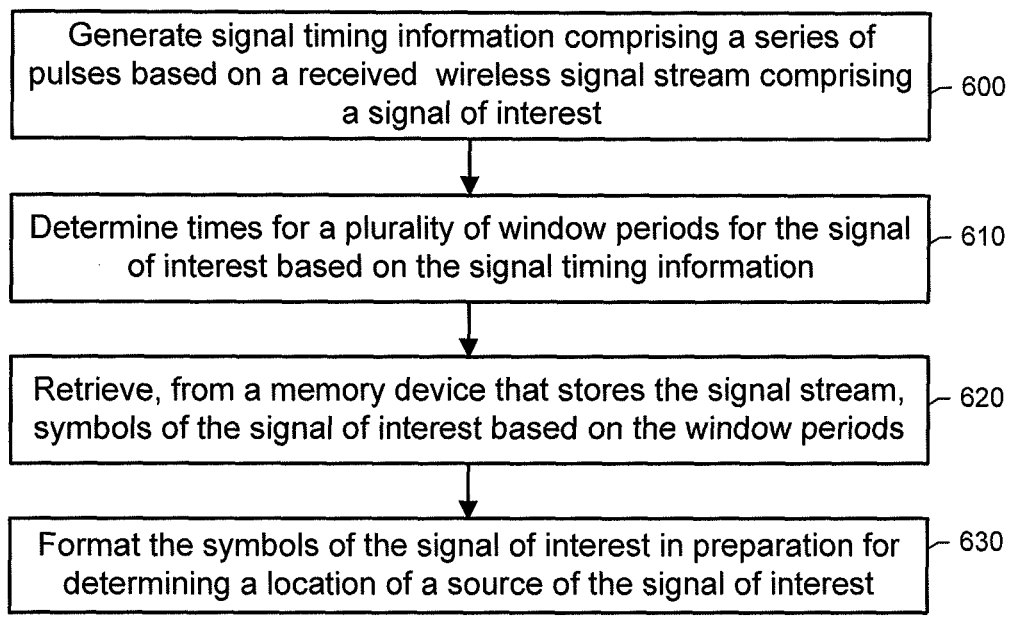
FIG. 6 is a flowchart of a method for signal formatting according to various example embodiments of the present invention.

FIG. 6 depicts a flowchart of an example method that may be performed by processing circuitry, such as, for example, the processor 214 and/or the DSP 218 described above. In this regard, the processing circuitry may be configured to implement the functionality described with respect to FIG. 6 as well as the other functionality, or subset of the functionality, of the receiver 105 described herein. Further, the functionality described in association with FIG. 6 may be implemented by an apparatus that is directed to perform the functionality in response to the execution of program code that is appropriately configured.

The example method of FIG. 6 may include, at 600, generating signal timing information that includes a series of pulses based on a received wireless signal stream comprising a signal of interest. In this regard, the pulses may be time-compressed portions of the signal of interest, and a matched filter may be implemented to generate the signal timing information. The example method may further include, at 610, determining times for a plurality of window periods for the signal of interest based on the signal timing information. Each timing window may be associated with a respective pulse of the timing information. Window controllers may be implemented to determine the times for the plurality of timing windows. According to some example embodiments, the example method may also include retrieving, from a memory device that stores the signal stream, symbols of the signal of interest based on the window periods at 620. Additionally, at 630, the example method may also include formatting the symbols of the signal of interest in preparation for determining a location of a source of the signal of interest.

According to some example embodiments, the example method may further include receiving the wireless signal stream that includes the signal of interest, and storing the wireless signal stream in the memory device. Additionally, or alternatively, storing the wireless signal stream may include storing the wireless signal stream such that the memory device operates as a circular buffer for incoming wireless signals. Further, according to various example embodiments, the operation of generating the signal timing information may additionally or alternatively include generating the signal timing information via at least one matched filter. In some example embodiments, generating the series of pulses may include generating the series of pulses or one or more pulses where each pulse is time-compressed based on a spread ratio. In some additional or alternative example embodiments, formatting the symbols may include filtering data within the retrieved symbols to include only portions of the signal of interest that are associated with the window periods. The example method, according to some example embodiments, may additionally or alternatively include preparing to or processing data to determine the location of the source of the signal of interest by estimating a phase of the signal of interest via utilization of quadrature sampled data from the signal of interest, and reducing interference and noise by processing a portion of the signal of interest that is in-phase with the estimated phase. Additionally or alternatively, according to some example embodiments, the example method may include receiving a plurality of wireless signal streams, where each signal stream within the plurality having a respective carrier frequency or a respective channel. Further in this regard, according to some example embodiments, generating the signal timing information and determining the times for the plurality of window periods may be performed with respect to a signal of interest for each of the respective carrier frequencies or respective channels.

FIG. 6 describes example methods and computer program products in accordance with various example embodiments of the present invention. FIG. 6 illustrates flowcharts of a system, method, and computer program product according to example embodiments of the invention. It will be understood that each block, step, or operation of the flowcharts, and/or combinations of blocks, steps, or operations in the flowcharts, can be implemented by various means. Means for implementing the blocks, steps, or operations of the flowcharts, combinations of the blocks, steps or operations in the flowcharts or other functionality of example embodiments of the invention described herein may include hardware, and/or a computer program products including a computer-readable storage medium having one or more computer program code instructions, program instructions, or executable computer-readable program code instructions store therein. In this regard, program code instructions may be stored on a memory device of an apparatus, such as the receiver 105, and executed by a processing circuitry, such as the processor 214. As will be appreciated, any such program code instructions may be loaded onto a computer or other programmable apparatus from a computer-readable storage medium to produce a particular machine, such that the particular machine becomes a means for implementing the functions specified in the flowcharts block(s), step(s), or operation(s). These program code instructions may also be stored in a computer-readable storage medium that can direct a computer, processing circuitry, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s), step(s), or operation(s). The program code instructions may be retrieved from a computer-readable storage medium and loaded into a computer, processing circuitry, processor, or other programmable apparatus to configure the computer, processing circuitry, processor, or other programmable apparatus to execute operational steps to be performed on or by the computer, processing circuitry, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide steps for implementing the functions specified in the flowcharts' block(s), step(s), or operation(s).

Accordingly, execution of instructions associated with the blocks, steps, or operations of the flowcharts by a processor, or storage of instructions associated with the blocks, steps, or operations of the flowcharts in a computer-readable storage medium, support combinations of means for performing the specified functions and combinations of steps for performing the specified functions. It will also be understood that one or more blocks, steps, or operations of the flowcharts, and combinations of blocks, steps, or operations in the flowcharts, may be implemented by special purpose hardware-based computer systems and/or processors which perform the specified functions or steps, or combinations of special purpose hardware and program code instructions.

Another example embodiment may be a system. The example system may comprise a plurality of receivers comprising a first receiver and a plurality of node devices. The first receiver comprises processing circuitry (e.g., signal triggering and formatting unit 210). The processing circuitry of the first receiver may be configured to at least receive a wireless signal stream from at least one of the node device, where the wireless signal stream includes a signal of interest; generate signal timing information comprising a series of pulses based on a received wireless signal stream, the pulses being time-compressed portions of the signal of interest; and determine times for a plurality of window periods for the signal of interest based on the signal timing information, wherein each timing window is associated with a respective pulse of the timing information.

According to some example embodiments, the example system may further comprise a location processing service (e.g., location processing service 120). The processing circuitry of the first receiver may, in some example embodiments, be further configured to retrieve, from a memory device that stores the signal stream, symbols of the signal of interest based on the window periods; format the symbols of the signal of interest in preparation for determining a location of a source of the signal of interest; and send time of arrival information based on the formatted symbols to the location processing service. In this regard, the location processing service may be configured to determine the location of the source of the signal of interest based on the time of arrival information.

Additionally, or alternatively, in some example embodiments, the processing circuitry of the first receiver that is configured to format the symbols may also be configured to filter data within the retrieved symbols to include only portions of the signal of interest that are associated with the window periods. Additionally or alternatively, the processing circuitry of the first receiver that is configured to process data to facilitate determining the location of the source of the signal of interest includes being configured to estimate a phase of the signal of interest via utilization of quadrature sampled data from the signal of interest, and reduce interference and noise by processing a portion of the signal of interest that is in-phase with the estimated phase.

In some example embodiments, the processing circuitry of the first receiver may be further configured to store the wireless signal stream in a memory device. Additionally, or alternatively, the processing circuitry of the first receiver configured to store the wireless signal stream may be configured to store the wireless signal stream such that the memory device operates as a circular buffer for incoming wireless signals. According to some example embodiments, the processing circuitry of the first receiver configured to generate the signal timing information may be configured to generate the signal timing information via at least one matched filter. Additionally or alternatively, the processing circuitry of the first receiver configured to generate the series of pulses may also be configured to generate the series of pulses where each pulse is time-compressed based on a spread ratio. Additionally or alternatively, the processing circuitry of the first receiver is further configured to receive a plurality of wireless signal streams, where each signal stream within the plurality having a respective carrier frequency. The processing circuitry of the first receiver may be further configured to generate the signal timing information and determine the times for the plurality of window periods to with respect to a signal of interest for each of the respective carrier frequencies.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the description provided herein. In this regard, for example, different combinations of elements and/or functions other than those explicitly described above are also contemplated. Although specific terms are employed herein, they are used in a generic and descriptive sense only and not for purposes of limitation.

What is claimed is:

1. A system for locating a signal source, the system comprising:
    a plurality of receivers including a first receiver; and
    a plurality of node devices, wherein the first receiver includes processing circuitry configured to perform operations including:
        receiving a plurality of wireless signal streams that originated from at least one of the node devices, wherein each of the wireless signal streams includes a signal of interest and has a respective carrier frequency;
        generating signal timing information including one or more pulses corresponding to a correlation with one or more frequencies based on each of the plurality of wireless signal streams, the pulses being time-compressed portions of the signal of interest;
        determining times for a plurality of window periods for the signal of interest with respect to the signal timing information for each of the respective carrier frequencies, wherein each window period is associated with a respective pulse of the signal timing information;
        applying times and one or more determined gains for the signal of interest to permit estimate of a phase of the received signal for a time-of-arrival determination;
        retrieving, from a memory device that stores the wireless signal streams, symbols of the signal of interest based on the window periods;
        formatting the symbols of the signal of interest in preparation for determining a location of a source of the signal of interest;
        determining time of arrival information based on the formatted symbols; and
        providing the time of arrival information to a location processing service, wherein the location processing service is configured to determine the location of the source of the signal of interest based on the time of arrival information.

2. The system of claim 1, wherein the processing circuitry of the first receiver is configured to format the symbols by filtering data within the retrieved symbols to include only portions of the signal of interest that are associated with the window periods.

3. The system of claim 1, wherein the processing circuitry of the first, receiver is further configured to:
    estimate the phase of the signal of interest via utilization of quadrature sampled data from the signal of interest; and
    reduce interference and noise by processing a portion of the signal of interest that is in-phase with the estimated phase.

4. The system of claim 1, wherein, the processing circuitry of the first receiver is further configured to store the wireless signal streams in the memory device.

5. The system of claim 4, wherein the processing circuitry of the first receiver configured to store the wireless signal streams stream such that the memory device operates as a circular buffer for incoming wireless signals.

6. The system of claim 1, wherein the processing circuitry of the first receiver is configured to generate the signal timing information via at least one matched filter.

7. The system of claim 1, wherein the processing each of the one or more pulses is time-compressed based on a spread ratio.

8. A method comprising:
    receiving a plurality of wireless signal streams that originated from at least one node device, wherein each wireless signal stream includes a signal of interest and has a respective carrier frequency;
    generating signal timing information including one or more pulses corresponding to a correlation with one or more frequencies based on each of the plurality of wireless signal streams, the pulses being time-compressed portions of the signal of interest;
    determining times for a plurality of window periods for the signal of interest with respect to the signal timing information for each of the respective carrier frequencies, wherein each window period is associated with a respective pulse of the timing information;
    applying times and one or more determined gains for the signal of interest to permit estimate of a phase of the received signal for a time-of-arrival determination;
    retrieving, from a memory device that stores the wireless signal streams, symbols of the signal of interest based on the window periods;
    formatting the symbols of the signal of interest in preparation for determining a location of a source of the signal of interest;
    determining time of arrival information based on the formatted symbols; and
    providing the time of arrival information to a location processing service to determine the location of the source of the signal based on the time of arrival information.

9. The method of claim 8, wherein formatting the symbols includes filtering data within the retrieved symbols to include only portions of the signal of interest that are associated with the window periods.

10. The method of claim 8 further comprising:
    estimating the phase of the signal of interest via, utilization of quadrature sampled data from the signal of interest; and
    reducing interference and noise by processing a portion of the signal of interest that is in-phase with the estimated phase.

11. The method of claim 8, further comprising storing the wireless signal streams in the memory device.

12. The method of claim 11, wherein storing the wireless signal streams includes storing the wireless signal streams such that the memory device operates as a circular buffer for incoming wireless signals.

13. The method of claim 8, wherein generating the signal timing information includes generating the signal timing information via at least one matched lifter.

14. The method of claim 8, wherein generating the signal timing information includes generating the one or more pulses where each pulse is time-compressed based on a spread ratio.

15. An apparatus comprising processing circuitry configured to perform operations including:
   receiving a plurality of wireless signal streams from at least one node device, wherein each wireless signal stream includes a signal of interest and has a respective carrier frequency;
   generating signal timing information including one or more of pulses corresponding to a correlation with one or more frequencies based on each of the plurality of wireless signal streams, the pulses being time-compressed portions of the signal of interest;
   determining times for a plurality of window periods for the signal of interest with respect to the signal timing information for each of the respective carrier frequencies, wherein each window period is associated with a respective pulse of the timing information;
   applying times and gains for the signal of interest to permit estimate of a phase of the received signal for a time-of-arrival determination;
   retrieving, from a memory device that stores the wireless signal streams, symbols of the signal of interest based on the window periods;
   formatting the symbols of the signal of interest in preparation for determining a location of a source of the signal of interest;
   determining time of arrival information based on the formatted symbols; and
   provide the time of arrival information to a location processing service to determine the location of the source of the signal based on the time of arrival information.

16. The apparatus of claim 15, wherein the processing circuitry is configured to format the symbols by filtering data within the retrieved symbols to include only portions of the signal of interest that are associated with the window periods.

17. The apparatus of claim 15, wherein the processing circuitry is further configured to:
   estimate the phase of the signal of Interest via utilization of quadrature sampled data from the signal of interest; and
   reduce interference and noise by processing a portion of the signal of interest that is in-phase with the estimated phase.

18. The apparatus of claim 15, wherein the processing circuitry is further configured to store the wireless signal streams in the memory device.

19. The apparatus of claim 18, wherein the processing circuitry is configured to store the wireless signal streams such that the memory device operates as a circular buffer for incoming wireless signals.

20. The apparatus of claim 15, wherein the processing circuitry configured to generate the signal timing information via at least one matched filter.

21. The apparatus of claim 15, wherein the processing circuitry is configured to generate the signal timing information where each pulse is time-compressed based on a spread ratio.

22. The apparatus of claim 15, wherein the apparatus comprises a wireless receiver configured to receive the wireless signal streams transmitted by the at least one node device.

23. The apparatus of claim 15, further comprising at least two antennas configured to receive the wireless signal streams.

24. The apparatus of claim 15, wherein the processing circuitry includes a field programmable logic array.

25. A non-transitory computer-readable storage medium having program code stored thereon, the program code being configured to, upon execution, direct an apparatus to perform operations including:
   receiving a plurality of wireless signal streams from at least one node device, wherein each wireless signal stream includes a signal of interest and has a respective carrier frequency;
   generating signal timing information including one or more of pulses corresponding to a correlation with one or more frequencies based on each of the plurality of wireless signal streams, the pulses being time-compressed portions of the signal of interest;
   determining times for a plurality of window periods for the signal of interest with respect to the signal timing information for each of the respective carrier frequencies, wherein each window period is associated with a respective pulse of the timing information;
   applying times and one or more determined gains for the signal of interest to permit estimate of the phase of the received signal for a time-of-arrival determination;
   retrieving, from a memory device that stores the wireless signal streams, symbols of the signal of interest based on the window periods;
   formatting the symbols of the signal of interest in preparation for determining a location of a source of the signal of interest;
   determining time of arrival information based on the formatted symbols; and
   providing the time of arrival information to a location processing service to determine the location of the source of the signal based on the time of arrival information.

26. The medium of claim 25, wherein the program code is configured to, upon execution, direct the apparatus to format the symbols by filtering data within the retrieved symbols to include only portions of the signal of interest that are associated with the window periods.

27. The medium of claim 25, wherein the program code is further configured to, upon execution, direct the apparatus to:
   estimate the phase of the signal of interest via utilization of quadrature sampled data from the signal of interest; and
   reduce interference and noise by processing a portion of the signal of interest that is in-phase with the estimated phase.

28. The medium of claim 25, wherein the program code is further configured to upon execution, direct the apparatus to store the wireless signal streams in the memory device.

29. The medium of claim 28, wherein the program code is configured to, upon execution, direct the apparatus to store the wireless signal streams such that the memory device operates as a circular buffer for incoming wireless signals.

30. The medium of claim 25, wherein the program code is configured to upon execution, direct the apparatus to venerate the signal timing information via at least one matched filter.

31. The medium of claim 25, wherein the program code is configured to, upon execution, direct the apparatus to generate the one or more of pulses where each pulse is time-compressed based on a spread ratio.

* * * * *